(12) United States Patent
Bhamidipaty et al.

(10) Patent No.: US 7,823,053 B2
(45) Date of Patent: Oct. 26, 2010

(54) SYSTEM AND METHOD FOR SEARCHING ERROR MESSAGES

(75) Inventors: Anuradha Bhamidipaty, Bangalore (IN); Vibha S Sinha, New Delhi (IN); Parul Alok Mittal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 11/612,921

(22) Filed: Dec. 19, 2006

(65) Prior Publication Data

US 2008/0148110 A1    Jun. 19, 2008

(51) Int. Cl.
*G06F 11/00* (2006.01)
(52) U.S. Cl. .......................... 714/799; 714/49; 714/774
(58) Field of Classification Search .................. 714/799, 714/49, 774
See application file for complete search history.

(56) References Cited

U.S. PATENT DOCUMENTS

| | | | | |
|---|---|---|---|---|
| 3,582,881 A | * | 6/1971 | Burton | 714/762 |
| 4,486,881 A | * | 12/1984 | de Couasnon | 714/758 |
| 5,148,432 A | * | 9/1992 | Gordon et al. | 714/7 |
| 5,317,647 A | * | 5/1994 | Pagallo | 382/161 |
| 5,751,829 A | * | 5/1998 | Ringland et al. | 382/100 |
| 5,845,120 A | | 12/1998 | Reddy et al. | |
| 5,854,794 A | * | 12/1998 | Pawlowski | 370/509 |
| 5,856,986 A | * | 1/1999 | Sobey | 714/777 |
| 5,936,978 A | * | 8/1999 | Ramesh et al. | 714/762 |
| 6,115,544 A | | 9/2000 | Mueller | |
| 6,138,253 A | | 10/2000 | Buzsaki | |
| 6,269,460 B1 | | 7/2001 | Snover | |
| 6,565,608 B1 | | 5/2003 | Fein et al. | |
| 6,966,014 B2 | | 11/2005 | Ueoka et al. | |
| 2004/0078689 A1 | | 4/2004 | Knuutila et al. | |
| 2005/0138486 A1 | | 6/2005 | Gromyko | |
| 2007/0011124 A1 | * | 1/2007 | Behdjati et al. | 706/45 |

OTHER PUBLICATIONS

G. Melancon et al., "DAG drawing from an information visualization perspective," INS Report INS-R9915, Nov. 30, 1999.
IBM, "Autonomic Computing Policy Language," First edition, Nov. 2005.

(Continued)

*Primary Examiner*—M. Mujtaba K Chaudry
(74) *Attorney, Agent, or Firm*—Gibb I.P. Law Firm, LLC (57) ABSTRACT

A user interface component receives an input error message. A query enhancer component derives error messages from the input error messages using error pattern(s) representative of the input error message and error sub-pattern(s) of the error pattern(s). A result aggregator component inputs each error message to search engines, receives search results, aggregates the search results, and provides the search results to the user interface. The enhancer component may include a pattern composer component to locate error patterns representative of the input error message, and a sub-pattern generator component to derive error sub-patterns from the error patterns. The aggregator component may determine whether the search results are in agreement with a predetermined criterion. If not, the aggregator component may request the enhancer component to provide additional error messages to input to the search engines. This process can be iteratively repeated until the search results are in agreement with the predetermined criterion.

1 Claim, 4 Drawing Sheets

OTHER PUBLICATIONS

P. Healy et al., "A branch-and-cut approach to the directed acyclic graph layering problem," Procs. of the 10th Int'l Graph Dwg'g Symp., Graph Drawing 2002, pp. 98-109.

A. Gupta et al., "Web page ranking based on events," in Procs. of the 5th Int'l Conf. on Elec. Commerce & Web Technologies, pp. 287-295, 2004.

D. Angluin, "Finding patterns common to a set of strings (extended abstract)," Theory of Computing, 1979.

A. Aho, "Algorithms for finding patterns in strings," Handbook of TCS (J. Jan Leeuwen, ed.), vol. A, chp. 5, Elsevier, 1990.

Bhamidipaty et al., U.S. Appl. No. 12/061,756, Office Action Communication, Jun. 15, 2010, 6 pages.

* cited by examiner

SYSTEM AND METHOD FOR SEARCHING ERROR MESSAGES

FIELD OF THE INVENTION

The present invention relates generally to efficiently searching error messages based on error patterns, such as those encountered by users when using and/or developing software and/or hardware, and more specifically to searching for causes and/or solutions to such error messages based on inherent patterns in the error messages.

BACKGROUND OF THE INVENTION

Conventionally, the use of software and/or hardware on a computer system commonly leads to users of the computer systems encountering error messages. One way to find the cause and/or solution for an error message is to enter the error message into a search engine and perform a search on the error message. Searching for an error message as is can lead to very few or very large number of results as illustrated in the example below.

For example, an error message may contain parameters that are specific to the execution of a given computer program. An error encountered in the open-source database program MySQL®, available on the Internet at www.MySQL.com, when the program is unable to open a shared library mydb.so is "Error 1126: Can't open a shared library mydb.so." In this error message, the parameter "mydb.so" is specific to the execution of the program. A disadvantage is that if such a specific error message is searched for using a search engine, the number of search results returned may be too limited or may typically yield irrelevant results. By comparison, searching for a more general error message, like "authentication failed," may generate too many search results to be of value and again providing too many irrelevant results. A further disadvantage is that if the error message is searched as is, i.e., the complete error message is provided to the search engine, the resultant set may contain no result or a set of results that are irrelevant to the context being searched.

Further, users are typically not aware of the particular formats of error messages, and it becomes tedious and cumbersome for the users to identify and remove execution-specific parameters from the error messages in order to refine the search query. If the user is able to perform this identity and removal, the user has to manually and iteratively search for the error message using a suitable search engine, starting with the error message received and then generalizing the error message or making it more specific until a relevant set of results is found. A disadvantage is that such a manually iterative process, however, is also inconvenient for users and time consuming.

Therefore, there is a need to alleviate one or more of the disadvantages by an improved system and method of efficiently searching error messages thereby finding the cause and/or solution to the error messages.

SUMMARY OF THE INVENTION

The present invention relates to efficiently searching error messages. A system of one embodiment of the invention includes a user interface component, a query enhancer component, and a result aggregator component. The user interface component is configured to receive an input error message, for example entered by a user. The query enhancer component is configured to derive a number of error messages from the input error message, using one or more error patterns representative of the input error message and one or more error sub-patterns of the error patterns The result aggregator component is configured to input each error message to one or more search engines, receive search results for each error message, aggregate the search results for the error messages, and provides the search results back to the user interface, such as for display to the user.

In a further embodiment, the query enhancer component includes a pattern composer component configured to locate one or more error patterns representative of the input error message. The query enhancer component may further include a knowledge base that the pattern composer component uses to locate the error patterns. The query enhancer component may also include a sub-pattern generator component to derive a number of error sub-patterns from the error patterns, where each error sub-pattern is one of the error messages that are input to the search engines.

In a further embodiment, the result aggregator component, upon receiving the search results for the error messages, is configured to determine whether the search results are satisfactory in accordance with a predetermined criterion. If the search results are unsatisfactory, the result aggregator component requests the query enhancer component to provide one or more additional error messages for the result aggregator component to input to the search engines. This process can be iteratively repeated, preferably automatically, until search results that are yielded satisfy the predetermined criterion.

A method of one embodiment of the invention includes receiving an input error message. A number of error messages are derived from the input error message using one or more error patterns representative of the input error message and one or more error sub-patterns of the error patterns, and the derived error messages are input to one or more search engines. Search results are received for the error messages and displayed. The error messages may be derived from the input error messages by locating one or more error patterns representative of the input error message, and deriving error sub-patterns from these error patterns, where each error sub-pattern is one of the error messages. Furthermore, where the search results do not satisfy (i.e., are in disagreement with) a predetermined criterion, one or more additional error messages may be generated, these additional error messages are input to the search engines, and the search results for the additional error messages are retrieved, until the search results satisfy (i.e., are in agreement with) the predetermined criterion.

An article of manufacture of one embodiment of the invention includes a tangible computer-readable medium and means in the medium. The tangible computer-readable medium may be a recordable data storage medium, or another type of tangible computer-readable medium. The means is for deriving error messages from an input error message using an error pattern representative of the input error message and one or more error sub-patterns of the error pattern, inputting the error messages to one or more search engines, receiving search results for the error messages, and displaying the search results. The means may further perform other functionality, such as has already been described in relation to the system and method embodiments of the invention.

Embodiments of the invention provide for advantages over the prior art. A user may obtain useful search results from an error message, even if he or she is unaware of the particular format of the error message. The user does not have to manually iteratively search for the error message, since such iterative search is automatically performed. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments which are described in sufficient detail enabling those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

General Embodiment

Figure 1:
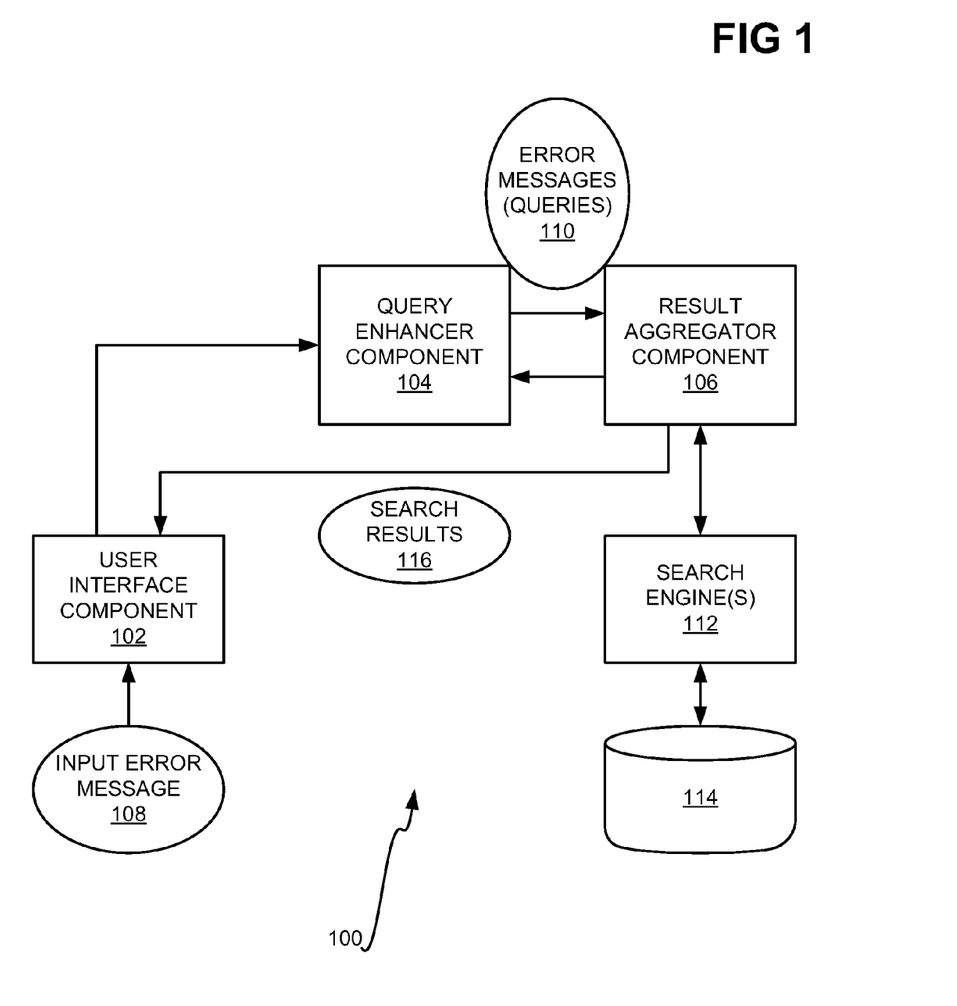
FIG. 1 is a diagram of a system for error message searching, according to a general embodiment of the invention.

FIG. 1 shows a system 100, according to an embodiment of the invention. The system 100 includes a user interface component 102, a query enhancer component 104, and a result aggregator component 106. Each of the components 102, 104, and 106 may be implemented in software, hardware, or a combination of software and hardware. As can be appreciated by those of ordinary skill within the art, the system 100 may include other components, in addition to and/or in lieu of those depicted in FIG. 1. The system 100 may be integrated within an integrated development environment (IDE), in one embodiment of the invention.

The user interface component 102 receives an input error message 108. The input error message 108 may be entered by a user, for instance. The input error message 108 can relate to an error message that a user has encountered while running software and/or hardware of a computer system, which may be the system 100, or a different computer system. The user interface component 102 sends the input error message to the query enhancer component 104.

The query enhancer component 104 derives a number of error messages 110 from the input error message 108. The error messages 110 may also be referred to as queries, and, in one specific embodiment, error sub-patterns, as is described in more detail in the next section of the detailed description, where the error sub-patterns are located by mapping an error format or pattern representative of the input error message 108 to these sub-patterns. The error messages 110 represent different forms, types, and/or kinds of error messages and are related to the input error message 108. For example, while entering the input error message 108 into a search engine may not yield satisfactory search results, entering some or all the error messages 110 into the search engine is more likely to yield satisfactory search results, for the user to determine the cause of and/or the solution for the input error message 108.

The error messages 110 are sent to the result aggregator component 106. The result aggregator component 106 inputs each of the error messages 110 to one or more search engines 112. The search engines 112 may include publicly accessible and/or general-purpose search engines, such as Google®, Yahoo!®, and so on, as known within the art, as well as privately accessible and/or special-purpose search engines, such as internal intranets or extranets, other databases of error messages, and so on. The user may be able to select which search engines 112 and which databases 114 are employed in this respect. The search engines 112 use databases 114 to locate relevant search results 116 for the error messages 110. The search results 116 may include web pages and/or other documents or information, for instance, which describe the cause of the input error message 108, the solution for the input error message 108, and/or other information.

The result aggregator component 106 thus receives the search results 116 from the search engines 112. The result aggregator component 106 can determine whether the search results 116 are satisfactory, in accordance with a predetermined criterion, as is described in detail in the next section of the detailed description. If the search results 116 are unsatisfactory 116, the result aggregator component 106 requests that the query enhancer component 104 provide additional error messages 110 for the aggregator component 106 to provide to the search engines 112. Thus, the searching process can be performed in an iterative manner, preferably automatically, until satisfactory search results 116 are obtained by the result aggregator component 106.

Thereafter, the result aggregator component 106 may aggregate the search results 116, so that, for instance, the most relevant search results are ordered first. One way of ordering the search results is from being most specific to most generic as determined by the number of custom parts being used in the pattern to generate the search results. The result aggregator component 106 returns the search results 116, as may be aggregated, to the user interface component 102. The user interface component 102 displays the search results 116, such as for viewing by a user. The user is thus able to locate relevant information regarding the input error message 108 without having to perform any iterative searching on the search engines 112, and further without having to know any specific information, such as formatting information, regarding the input error message 108.

Detailed and Alternative Embodiments

Figure 2:
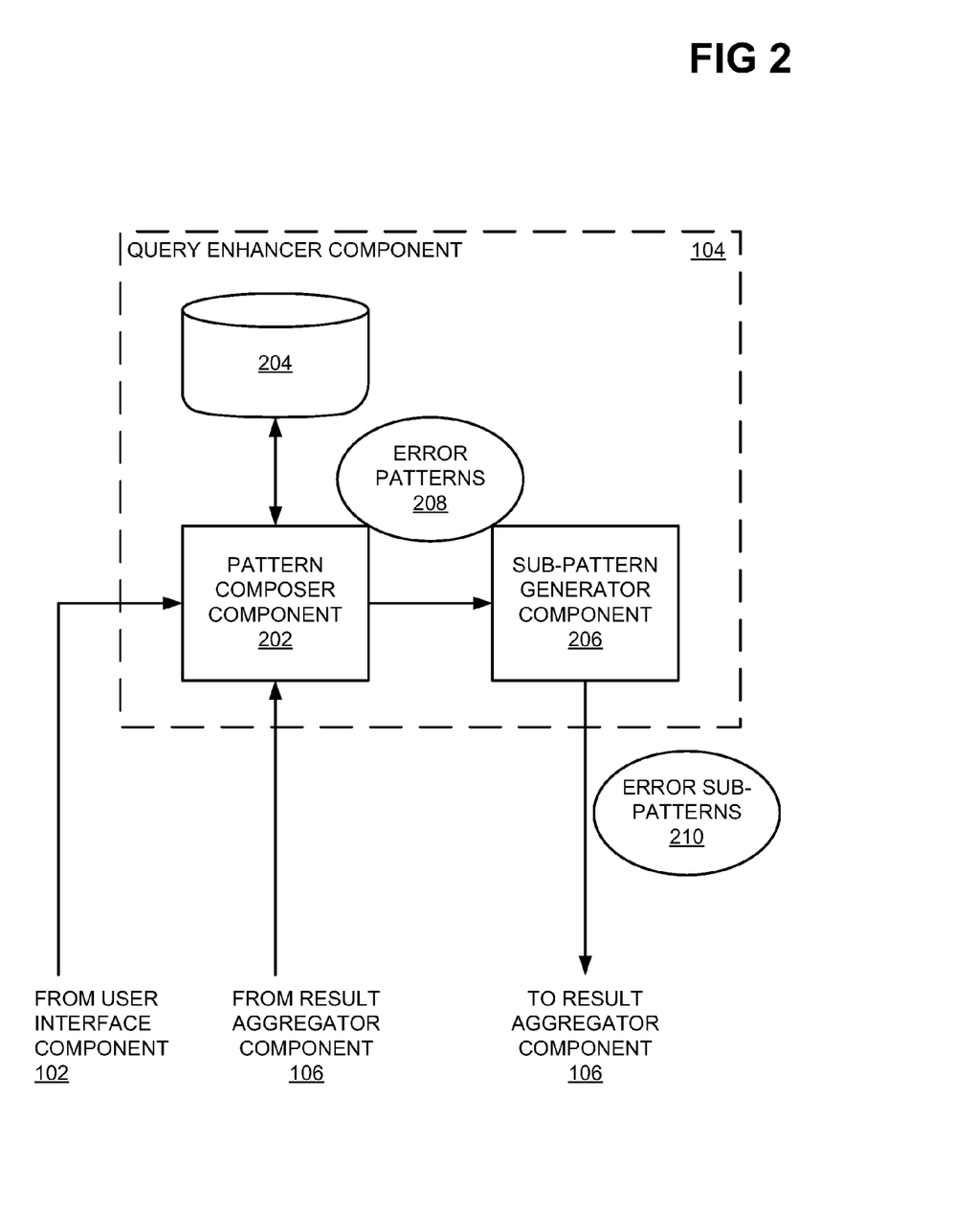
FIG. 2 is a diagram of a query enhancer component of the system of FIG. 1 in more detail, according to a more specific embodiment of the invention.

A detailed embodiment of the invention is described in relation to FIG. 2, which illustrates the query enhancer component 104 in more detail, according to an embodiment of the invention. The query enhancer component 104 includes a pattern composer component 202, a knowledge base 204, and a sub-pattern generator component 206. Each of the components 202 and 206 may be implemented in software, hardware, or a combination of software and hardware. As can be appreciated by those of ordinary skill within the art, the query enhancer component 104 may include other components, in addition to and/or in lieu of those depicted in FIG. 2.

The pattern composer component 202 receives the input error message 108 from the user interface component 102. The pattern composer component 202 locates one or more error patterns 208 that are representative of the input error message 108, by, for instance, using the repository 204 (knowledge base), for example a knowledge based repository. The error patterns 208 are particularly error message formats that most closely match the input error message 108. The pattern composer component 202 may perform regular expression matching against patterns available in the knowledge base 204 to locate the error patterns 208 representative of the input error message 108.

The pattern composer component 202 thus exploits the syntactic nature of the input error message 108 that is inherent in such error messages. For instance, most error messages are composed of a standard part and a custom part. The standard part provides a general description of an error, whereas the custom part contains information related to the context in which the error resulted, and thus may be dependent on the run-time environment of the user, or provide further information regarding the error.

For example, the DB2® database available from International Business Machines Corp., of Armonk, N.Y., includes the following two error messages: "SQL30082N Attempt to establish connection failed with security reason 24 (username and/or password invalid)"; and, "SQL30082N Attempt to establish connection failed with security reason 7 (userid revoked)". The representative pattern, or syntax, for both of these error messages is "SQL30082N Attempt to establish connection failed with security reason <reason-code><reason-string>". Therefore, the standard part of the above two errors is "SQL30082N Attempt to establish connection failed with security reason" whereas the custom part of the above two errors is "24" or "7", and "username and/or password invalid" or "user id revoked".

The knowledge base 204 thus provides representative patterns of the error messages 108 that the user may encounter. For instance, many standard development tools, computer programs, and technologies provide such representative patterns in their user manuals. Such user manuals may thus be a source for populating the knowledge base 204. Alternatively, minimal such error patterns may be determined from a collection of strings representing different error messages, such that a collection or repository of different error messages may first be generated, and then the representative error patterns of these messages determined. Two approaches for determining error patterns from a collection of strings includes that described in the reference Dana Angluin, "Finding patterns common to a set of strings," Theory of Computing (1979), and in the reference A. Aho, "Algorithms for finding patterns in strings," Handbook of TCS, volume A, chapter 5 (1990).

Therefore, when a user provides the input error message 108 via the user interface component 102, the pattern composer component 202 performs regular expression matching to determine which of the error patterns stored within the knowledge base 204 most closely match the error message 108. Alternatively, the pattern composer component 202 may use provided information regarding the software, hardware, or other technology providing the error message to determine its related error message formats. The pattern composer component 202 may determine such information from the input error message 108 itself or the user may provide this information to the user interface component 102.

The pattern composer component 202 sends the one or more error patterns 208 that are most representative of the input error message 108 to the sub-pattern generator component 206. The sub-pattern generator component 206 generates, or derives, error sub-patterns 210 from these error patterns 208. The error sub-patterns 210 are particularly the error messages, or queries, 110, that the result aggregator component 106 searches for via the search engines 112. In one embodiment, the sub-pattern generator component 206 derives the error sub-patterns 210 from the error patterns 208 by constructing different combinations of sub-parts of the error patterns 208.

For example, the input error message 108 may be "SQL30082N Attempt to establish connection failed with security reason 24 (username and/or password invalid)". The resulting error pattern 208 may thus be "SQL30082N Attempt to establish connection failed with security reason <reason-code><reason-string>". The (general) error pattern 208 may further be considered to include two standard and two custom parts, such as "Sa Sb Ca (Cb)". In the example, Sa is "SQL30082N," Sb is "Attempt to establish connection failed with security reason," Ca is "24" and Cb is "(username and/or password invalid)". As such, the following error sub-patterns 210 may be generated: (1) one pattern of size four (e.g., Sa Sb Ca Cb); (2) four patterns of size three (e.g., Sa Sb Ca, Sb Ca Cb, Ca Cb Sa, and Sa Sa Cb); (3) six patterns of size two (e.g., Sa Sb, and so on); and, (4) four patterns of size one (e.g., Sa, Sb, Ca, and Cb), where Sa, Sb, Ca, and Cb are as provided in the previous sentence. These error sub-patterns 210 are then sent to the result aggregator component 106 to search for via the search engines 112.

The result aggregator component 106 interacts with one or more search engines 112 having suitable information databases 114 to search for the error sub-patterns 210 in question. The results from the search engines 112 are passed back to the result aggregator component 106, which can aggregate the search results from multiple search engines 112. The result aggregator component 106 in one embodiment can also determine the number of error sub-patterns 210 that actually need to be searched, and the number of search results for each sub-pattern that are to be returned. This information may be captured and represented as a predetermined criterion, which may be provided by the user (such as via the user interface component 102), or as a system configuration parameter having default values. The predetermined criterion specifies the amount and type of information that is to be returned as the search results 116 for a given input error message 108.

The result aggregator component 106 thus may iteratively request additional error sub-patterns 210 until this predetermined criterion has been satisfied. Such additional sub-patterns 210 may be requested where insufficient search results are returned by the search engines 112. In response to such a request, the pattern composer component 202 may request that the sub-pattern generator component 206 generate and send further error sub-patterns 210 for the same error patterns 208 to the result aggregator component 106. If there are no further sub-patterns 210 that can be generated, the pattern composer 202 may locate additional error patterns 208 from within the knowledge base 204 that match the input error message 108, and request that the sub-pattern generator component 206 generate additional error sub-patterns 210 based on any such additional error patterns 208. This embodiment is particularly useful where the pattern composer component 202 sends just one error pattern 208 at a given instance of time to the sub-pattern generator component 206.

The result aggregator component 106 aggregates and sends the search results 116 to the user interface component 102 for display to the user. In one embodiment, the search results 116 may be displayed at the user interface component 102 as a directed acyclic graph (DAG). The root of the DAG represents the search results returned by the input error message 108. The edges from the root represent the error patterns 208 located by the pattern composer component 202 using the knowledge base 204. Each node within the DAG represents the set of the search results 116 returned by the error pattern represented by the edge connected to the node. The sub-tree for a node represents the sub-patterns 210 generated from an error pattern in question. In one embodiment, the search results 116 are displayed in accordance with the approach described in the reference P. Healy et al., "A branch-and-cut approach to the directed acyclic graph layering problem," Proceedings of the 10$^{th}$ International Graph Drawing Symposium, Graph Drawing 2002, pp. 98-109. In another embodiment, the search results 116 are displayed in accordance with the approach described in the reference G. Melancon et al., "DAG drawing from an information visualization perspective," DWI Report INS-R9915, Nov. 30, 1999.

Different alternative embodiments can be employed in relation to the error message search operation that has been described. In one embodiment, the user may provide additional information at the user interface component 102, besides the input error message 108, to aid the query enhancer component 104 to perform more effective searching. For instance, the user may specify the technology or product that is the source of the input error message 108. The query enhancer component 104 may incorporate this information within the patterns being searched for within the knowledge base 204 to reduce the search space and return additional relevant results.

In one embodiment, the pattern composer component 202 returns one error pattern 208. This single error pattern 208 may be the closest match to the input error message 108. However, in a further embodiment, the component 202 returns more than one error pattern 208.

In one embodiment, the sub-pattern generator component 206 may order the error sub-patterns 210 from being most specific to be most generic. This ordering can be helpful in limiting the search results 116 and aid in the display of the search results 116. The number of parts within an error message pattern and the number of custom parts can be used to order the sub-patterns 210 from being most specific to be most generic as well. For example, ordering the sub-patterns for the pattern "Sa Sb Ca Cb" from most specific to most generic yields "Sa Sb Ca Cb" as the most specific sub-pattern, followed by the sub-patterns of length three, followed by sub-patterns of length two, and finally followed by sub-patterns of length one.

In one embodiment of the invention, the number of error sub-patterns 210 determined by the sub-pattern generator component 206 can be a configuration parameter that can be input by a user. In another embodiment, the user may specify the predetermined criterion that governs whether the result aggregator component 106 returns the search results 116 to the user interface component 102 or whether it requests the query enhancer component 104 to provide additional error sub-patterns 210. One such criterion, for instance, is for the component 106 to return the top X results for each error pattern 208 and a total of Y results. Another example criterion is for the component 106 to iterate Z times in relation to the query enhancer component 104. In one embodiment, the criterion may be specified by a generic policy language, or by using simple rules. An example of a generic policy language is described within the reference "Autonomic Computing Policy Language," available at the web site http://dl.alphaworks.ibm.com/technologies/pmac/acpl.pdf.

Embodiments of the invention are not limited to the methodologies employed by the pattern composer component 202 to locate the error patterns 208 within the knowledge base 204. Likewise, embodiments are not limited to the methodologies employed by the sub-pattern generator component 206 to generate the error sub-patterns 210 from the error patterns 208. Thus, different methodologies may be employed, in addition to and/or in lieu of those described here.

Example

In this section of the detailed description, example performance of the error-searching approach that has been described in the previous sections of the detailed description is presented. An error may be encountered in the MySQL® database program when it is unable to open the shared library "so_assystem.so". The input error message 108 may be "Error 1126: Can't open shared library 'so_assystem.so' (errno: 22 so_assystem.so: cannot open shared object file: No such file or dir)". For descriptive convenience, this error message 108 is referred to as I.

Next, the representative error pattern 208 for this input error message 108 is "Error 1126: Can't open shard library '%s' (errno: %d %s)". For descriptive convenience, this error pattern 208 is referred to as P. Some sub-parts of this error pattern 208 are "Error 1126: Can't open shared library (errno:)", referred to as SP1; "Error 1126: Can't open shared library", referred to as SP2; "Error 1126: (errno:)", referred to as SP3; and, "Error 1126", referred to as SP4. The predetermined criterion may be to return the best 100 search results, which may specified by the user. Thus, the various error sub-patterns 210 are one or more different combinations of these sub-parts.

Figure 3:
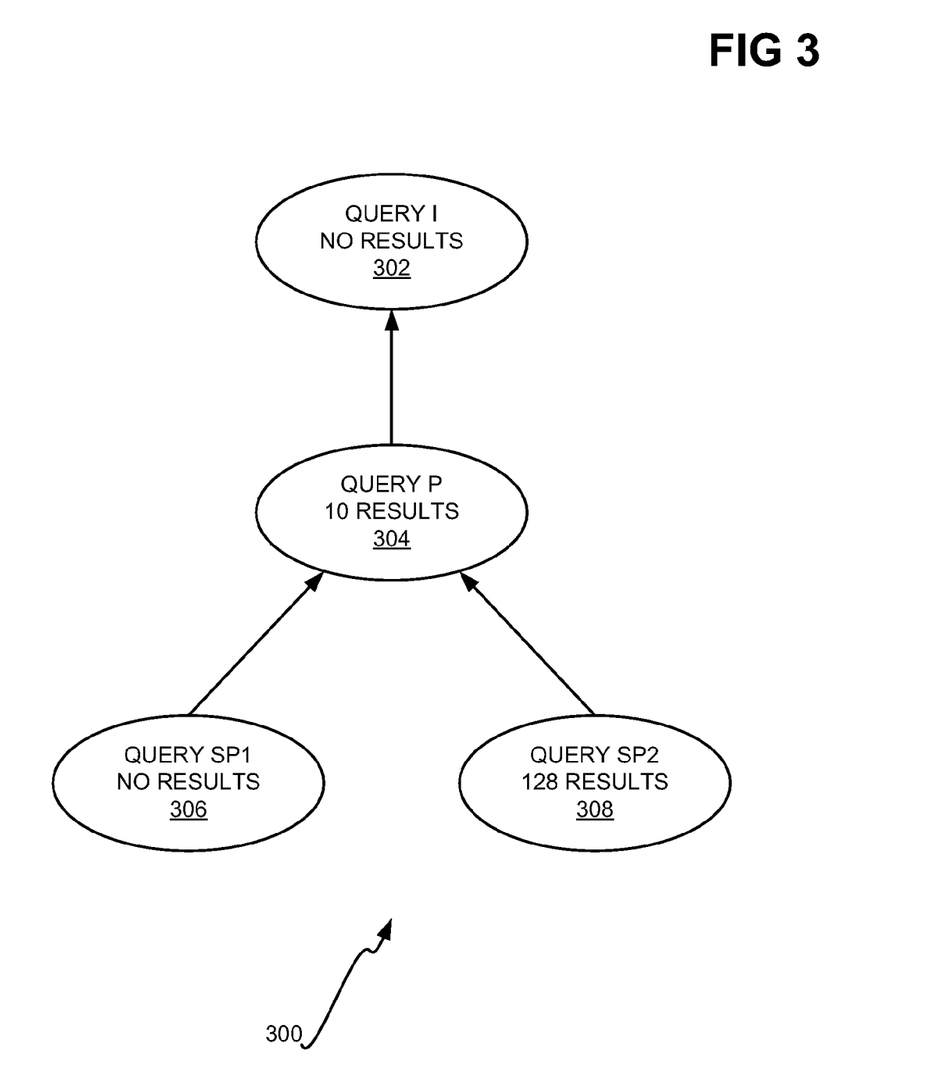
FIG. 3 is a diagram illustrative representative performance of searching for an error message, according to an embodiment of the invention.

FIG. 3 shows a directed acyclic graph (DAG) depicting the search results 116 in this example, according to an embodiment of the invention. The result aggregator component 106 may iteratively perform the following searches 1. The first search is to use the input error message 108 itself, which is the most complete combination of the sub-parts of the error pattern 208, and which may return no results, as indicated by the node 302. Because 100 search results have been requested, the component 106 continues searching.
2. The second search is thus to use the representative error pattern 208, which is the second most complete combination of the sub-parts of the error pattern 208, and which may return 10 results, as indicated by the node 304.
3. Because 100 searches have been requested, the component 106 continues searching. A third search may be thus to use the error sub-pattern made up of just SP1, which may return no results, as indicated by the node 306.
4. Again, because 100 searches have been requested, the component 106 continues searching. The fourth search may be thus to use the error sub-pattern made up of just SP2, which may return 128 results, as indicated by the node 306.

Searching is therefore completed, because more than 100 search results have been located. The search results 116 returned to the user can include the 10 results from node 304, plus 90 of the 128 results from node 308.

METHOD AND CONCLUSION

Figure 4:
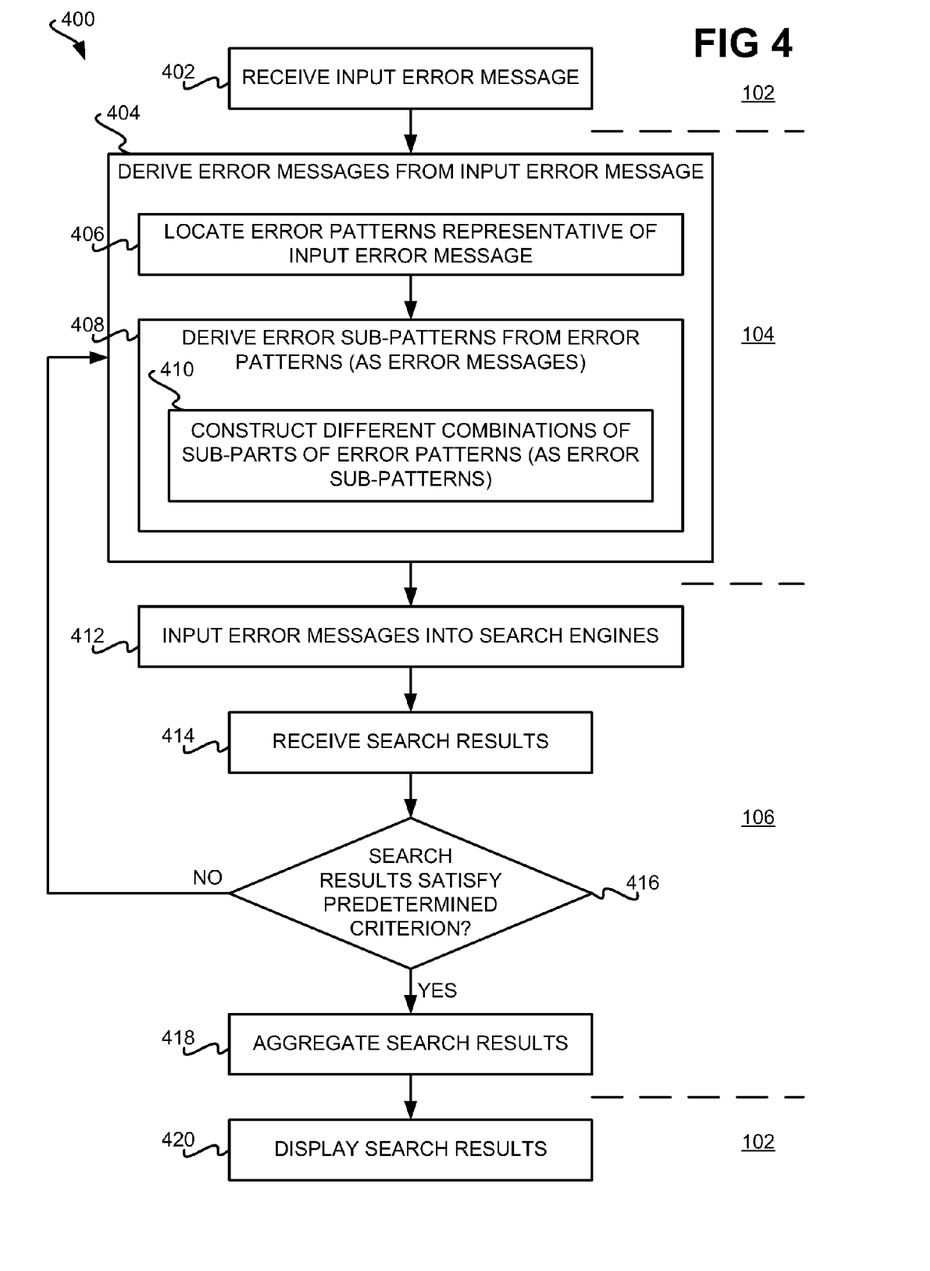
FIG. 4 is a flowchart of a method, according to an embodiment of the invention.

FIG. 4 shows a method 400 which summarizes the error-searching methodology that has been described in the previous sections of the detailed description, according to an embodiment of the invention. Different parts of the method 400 are performed by different components of the system 100. This is indicated in FIG. 4 by horizontal dotted lines. For instance, parts 402 and 420 are performed by the user interface component 102. Part 404 and its constituent parts are performed by the query enhancer component 104. Parts 412, 414, 416, and 418 are performed by the result aggregator component 106.

First, the input error message 108 is received (402). The error messages 110 are derived from the input error message 108 (404). In one embodiment, this is achieved by locating one or more error patterns 208 that are representative of the input error message 108 (406). Error sub-patterns 210 (which are the error messages 110 in this embodiment) are then derived from the error patterns 208 (408). For instance, different combinations of the sub-parts of the error patterns 208 may be constructed as the error sub-patterns 210 (410).

Next, the error messages 110 are input into one or more search engines 112 (412). The search results 116 are received from the search engines 112 (414). If the search results 116 are satisfactory (416)—that is, they satisfy (i.e., are in agreement with) a predetermined criterion—then the search results 116 are aggregated (418), and displayed to the user (420). Otherwise, if the search results 116 are unsatisfactory (416)—that is, they do not satisfy (i.e., are in disagreement with) the predetermined criterion—then the method 400 repeats at part 404.

It is noted that, although specific embodiments have been illustrated and described herein, it will be appreciated by those of ordinary skill in the art that any arrangement calculated to achieve the same purpose may be substituted for the specific embodiments shown and fall within the scope of this invention. This application is thus intended to cover any adaptations or variations of embodiments of the present invention. Therefore, it is manifestly intended that this invention be limited only by the claims and equivalents thereof.

We claim:

1. A method comprising:

receiving an input error message;

deriving a plurality of error messages from the input error message using one or more error patterns representative of the input error message and one or more error sub-patterns of the error patterns;

inputting the error messages derived from the input error message to one or more search engines;

receiving search results for the error messages;

aggregating the search results for the error messages in an order from more specific to more generic with respect to the input error message;

displaying the search results for the error messages; and after receiving the search results for the error messages, repeating determining whether the search results are in agreement with a predetermined criterion; and where the search results are in disagreement with the predetermined criterion, generating one or more additional error messages; inputting the additional error messages to the search engines; receiving the search results for the additional error messages, until the search results satisfy the predetermined criterion, wherein deriving the error messages from the input error message comprises: locating the error patterns representative of the input error message; and deriving the error sub-patterns from the error patterns, each error sub-pattern being one of the error messages, wherein deriving the error sub-patterns from the error patterns comprises constructing different combinations of sub-parts of the error patterns.

\* \* \* \* \*